(12) United States Patent
Gorecki et al.

(10) Patent No.: US 9,073,521 B2
(45) Date of Patent: Jul. 7, 2015

(54) RESERVOIR WITH VENT

(75) Inventors: Jarek R. Gorecki, Toronto (CA); Kulbir Singh Dhillon, Caledon (CA); Dirk Alfred Biese, Concord (CA); Karl-Willi Meyer, Wiesbaden (DE); Robert Virtu, Markham (CA)

(73) Assignee: Salflex Polymers Limited, Weston, ON (CA)

( * ) Notice: Subject to any disclaimer, the term of this patent is extended or adjusted under 35 U.S.C. 154(b) by 0 days.

(21) Appl. No.: 13/825,234

(22) PCT Filed: Sep. 23, 2011

(86) PCT No.: PCT/CA2011/001067
§ 371 (c)(1),
(2), (4) Date: Jun. 5, 2013

(87) PCT Pub. No.: WO2012/037662
PCT Pub. Date: Mar. 29, 2012

(65) Prior Publication Data
US 2013/0256326 A1    Oct. 3, 2013

Related U.S. Application Data

(60) Provisional application No. 61/385,706, filed on Sep. 23, 2010.

(51) Int. Cl.
*B60K 15/035* (2006.01)
*B60S 1/48* (2006.01)
*B60S 1/50* (2006.01)

(52) U.S. Cl.
CPC ..... *B60S 1/48* (2013.01); *B60S 1/50* (2013.01)

(58) Field of Classification Search
CPC ............. B60S 1/48; B60S 1/50; B67D 7/421; B60K 14/01; B62J 35/00
USPC ................................ 220/746, 508, 526, 859; 137/493.7–493.9, 508, 526, 859
See application file for complete search history.

(56) References Cited

U.S. PATENT DOCUMENTS 1,498,358 A * 6/1924 De Krafft .................... 137/493.9
2,937,658 A * 5/1960 Stewart ......................... 137/505

(Continued)

FOREIGN PATENT DOCUMENTS

FR          2414849        8/1979
WO    WO-2012/037662      3/2012

OTHER PUBLICATIONS

Gorecki, et al., "Reservoir With Vent".

(Continued)

*Primary Examiner* — Anthony Stashick
*Assistant Examiner* — James M Van Buskirk
(74) *Attorney, Agent, or Firm* — Medler Ferro PLLC

(57) ABSTRACT

A reservoir for storing and dispensing a fluid, the reservoir comprising a hollow vessel for holding a volume of fluid, an inlet port located on the hollow vessel for filling the reservoir with fluid, an outlet port located on the hollow vessel for dispensing the fluid, and a vent outlet located on the hollow vessel to permit venting during filling and dispensing operations. The vent outlet is provided in the form of a vent tube having a vent seal located at a base thereof. The vent seal allows for venting as required, while also serving as a flow restrictor to reduce the leakage of fluid from the vent tube in the event of sloshing within the reservoir.

19 Claims, 12 Drawing Sheets

(56) References Cited

U.S. PATENT DOCUMENTS

| | | | |
|---|---|---|---|
| 3,194,263 A * | 7/1965 | Riester | 137/508 |
| 3,334,779 A * | 8/1967 | Smith | 220/86.2 |
| 3,716,886 A * | 2/1973 | Klomp | 15/250.04 |
| 3,791,407 A * | 2/1974 | Nicholls | 137/512.15 |
| 3,794,202 A | 2/1974 | Unger | |
| 3,910,302 A * | 10/1975 | Sudhir | 137/43 |
| 3,945,392 A | 3/1976 | Deaton et al. | |
| 4,176,678 A | 12/1979 | Marchaix et al. | |
| 4,741,448 A | 5/1988 | Alley et al. | |
| 5,133,479 A | 7/1992 | Boyte, Sr. | |
| 5,462,100 A | 10/1995 | Covert et al. | |
| 5,988,415 A | 11/1999 | White | |
| 6,213,355 B1 | 4/2001 | Schwanenberg | |
| 6,273,309 B1 * | 8/2001 | Oppelt | 224/269 |
| 6,274,209 B1 | 8/2001 | Pagidas et al. | |
| 6,457,313 B1 * | 10/2002 | Fujii | 60/653 |
| 6,457,613 B1 * | 10/2002 | Patterson | 222/494 |
| 6,656,514 B1 * | 12/2003 | Tubbs | 426/115 |
| 7,448,365 B2 | 11/2008 | Mills | |
| 2004/0001989 A1 * | 1/2004 | Kinkelaar et al. | 429/34 |
| 2010/0147863 A1 | 6/2010 | Grun et al. | |

OTHER PUBLICATIONS

Gupta, A.K., "Automotive Vent Plug Cross Type", http://dir.indiamart.com/cgi/catprdsearch.mp?ss=Automotive+Vent+Plug+Cross+Type, 2013.

Supplementary European Search Report, EP Appl No. 11 82 6258.3, Mar. 4, 2015.

* cited by examiner

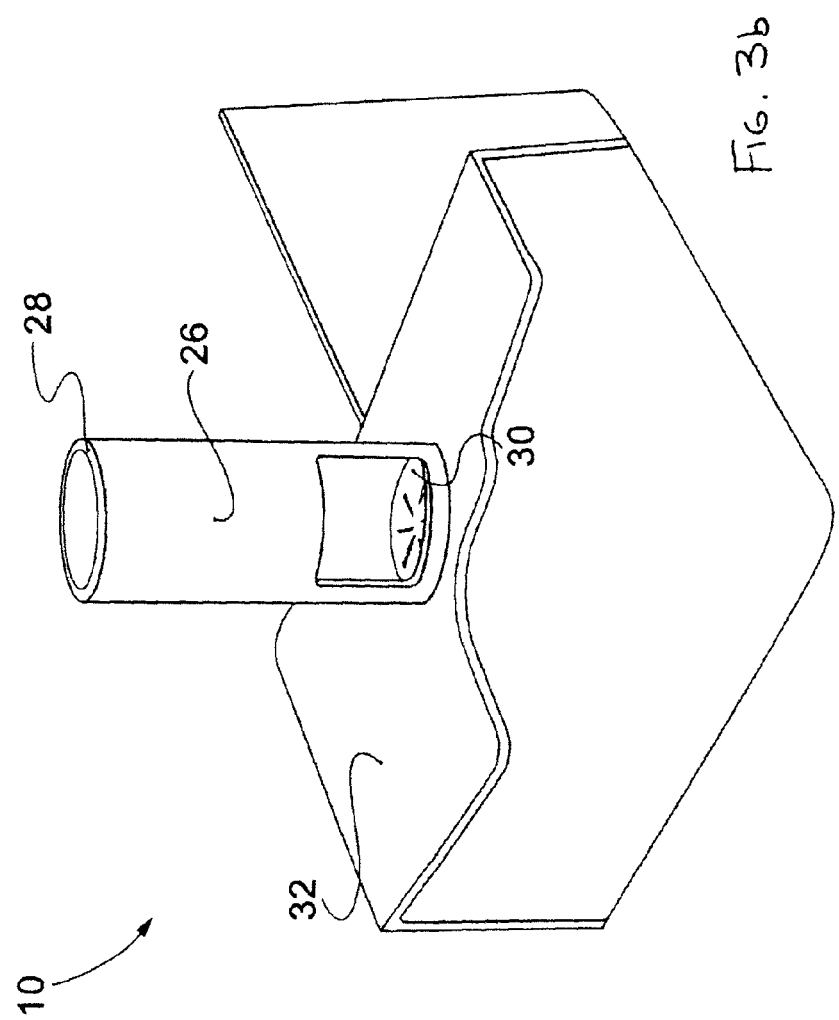

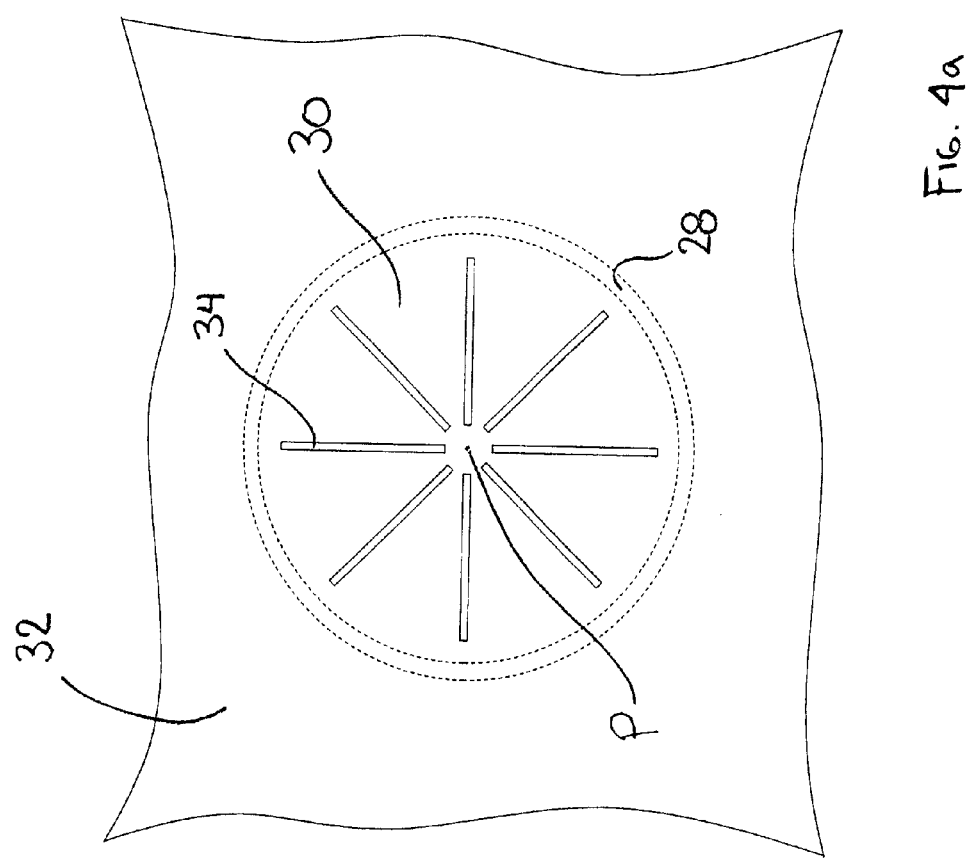

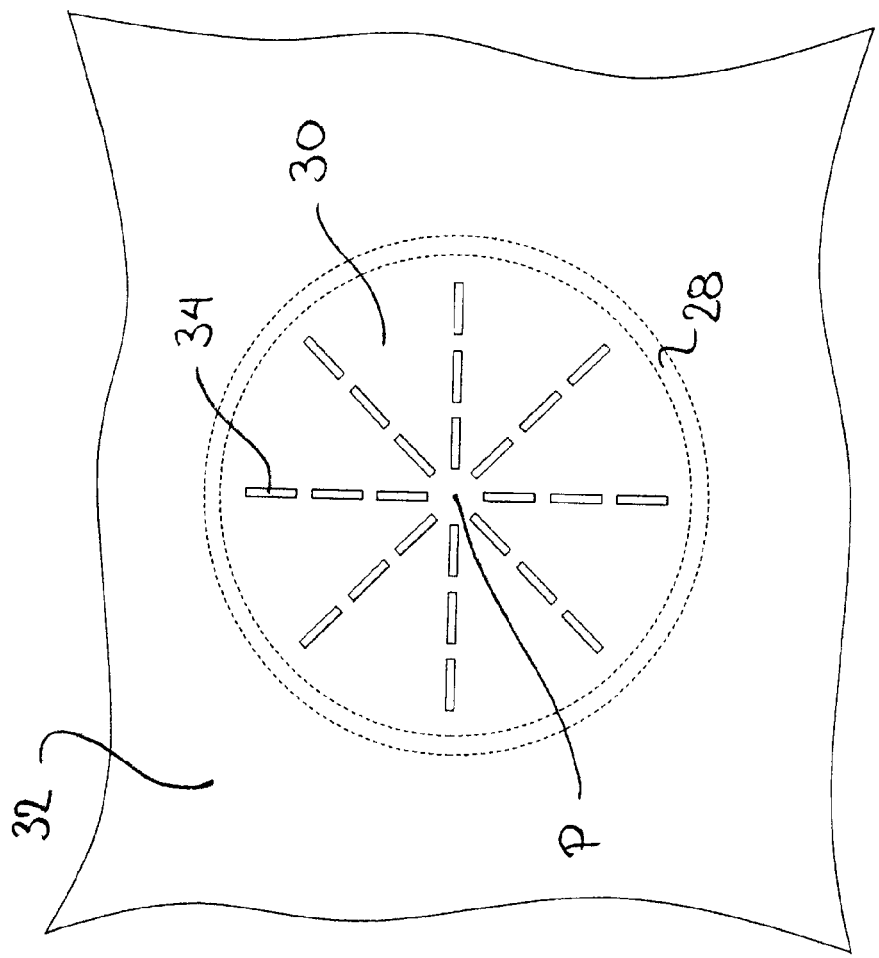

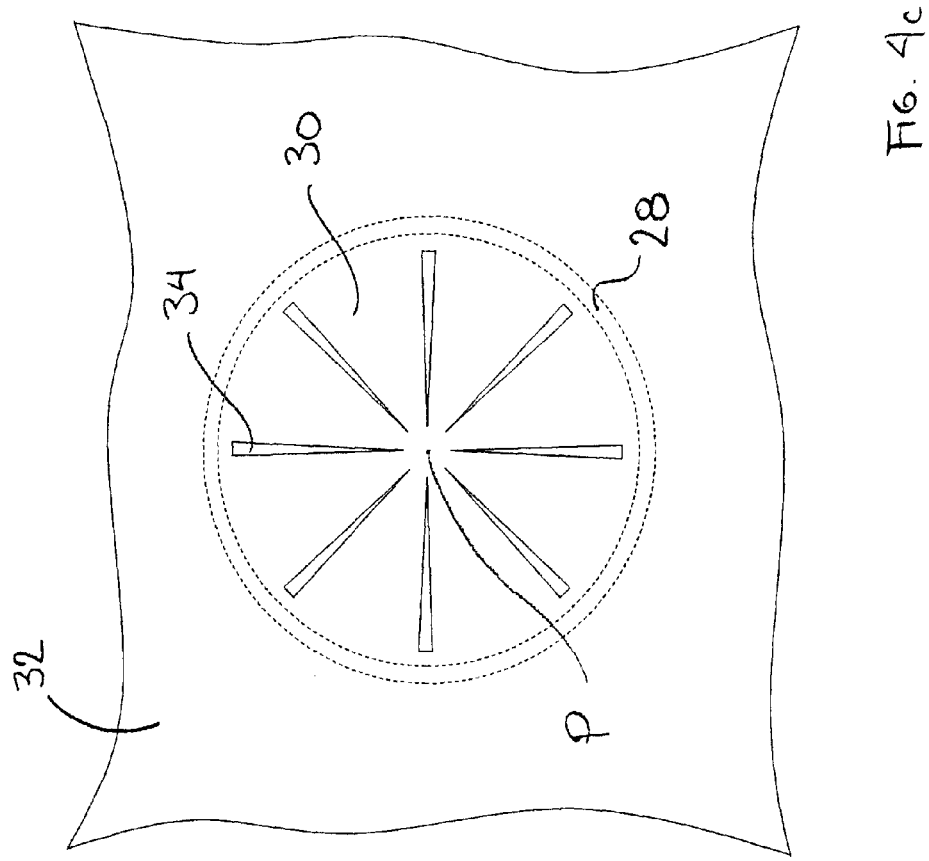

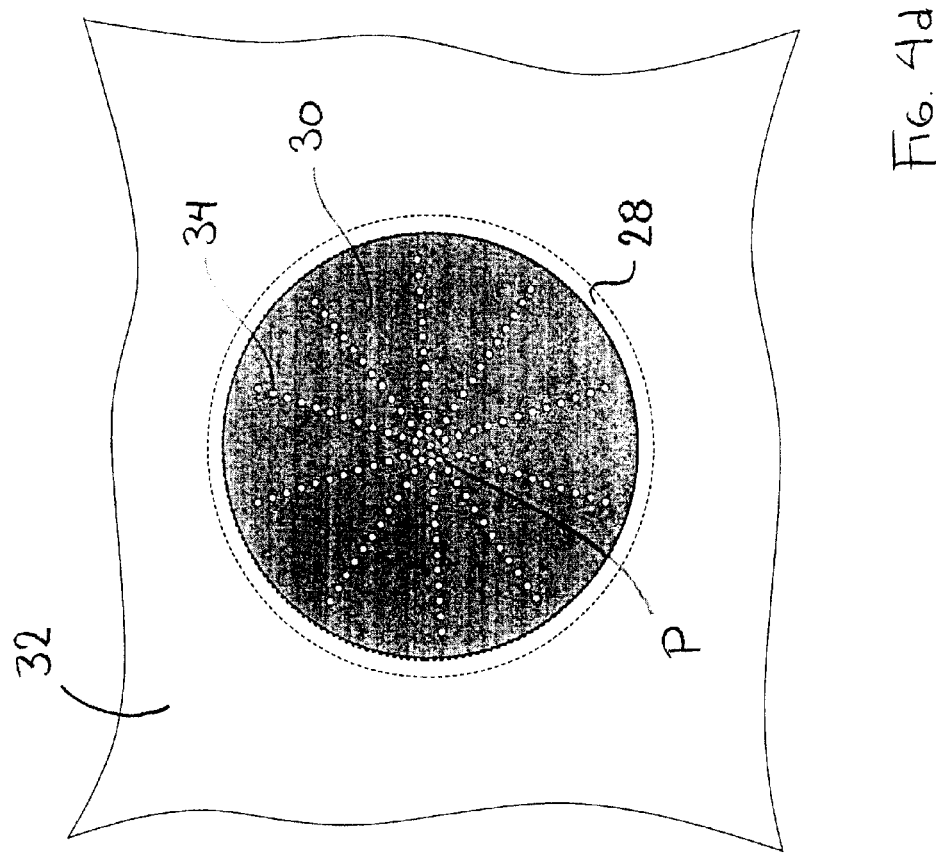

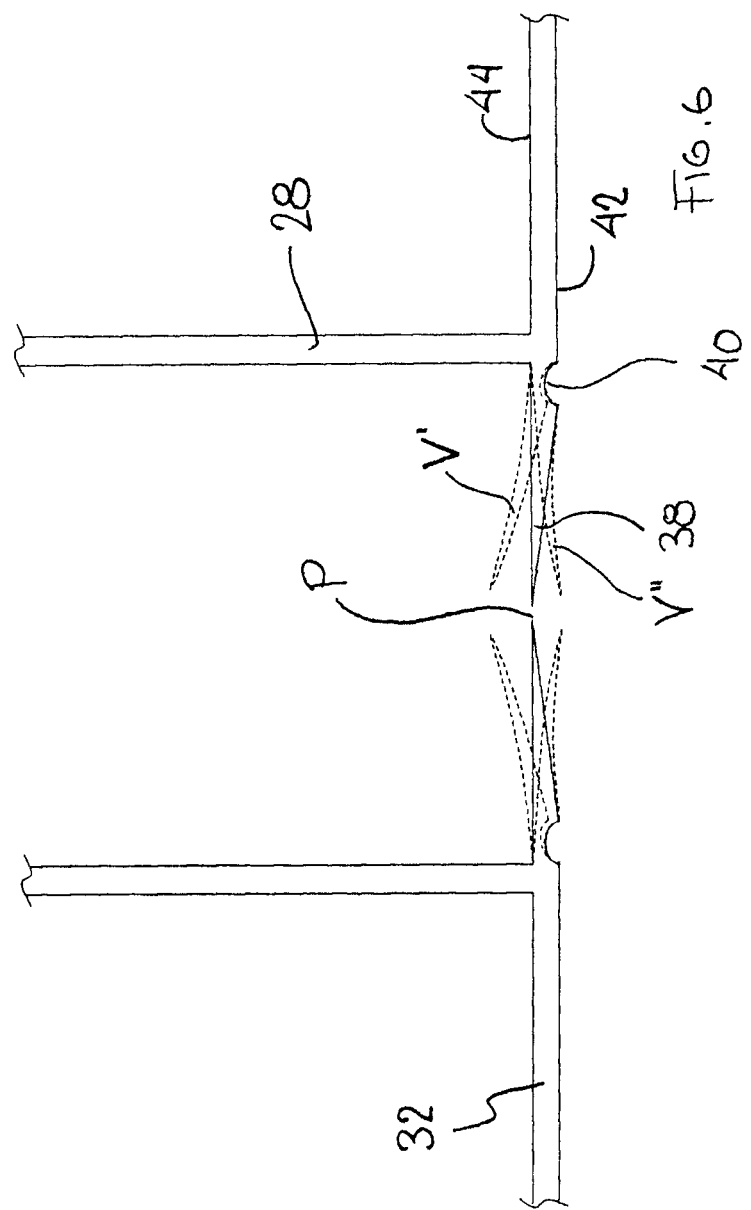

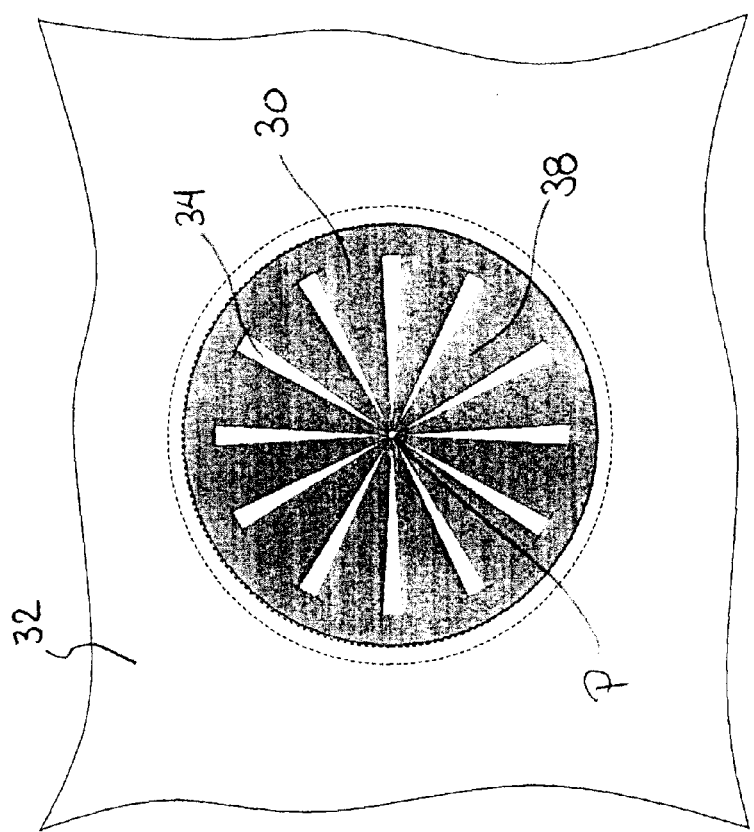

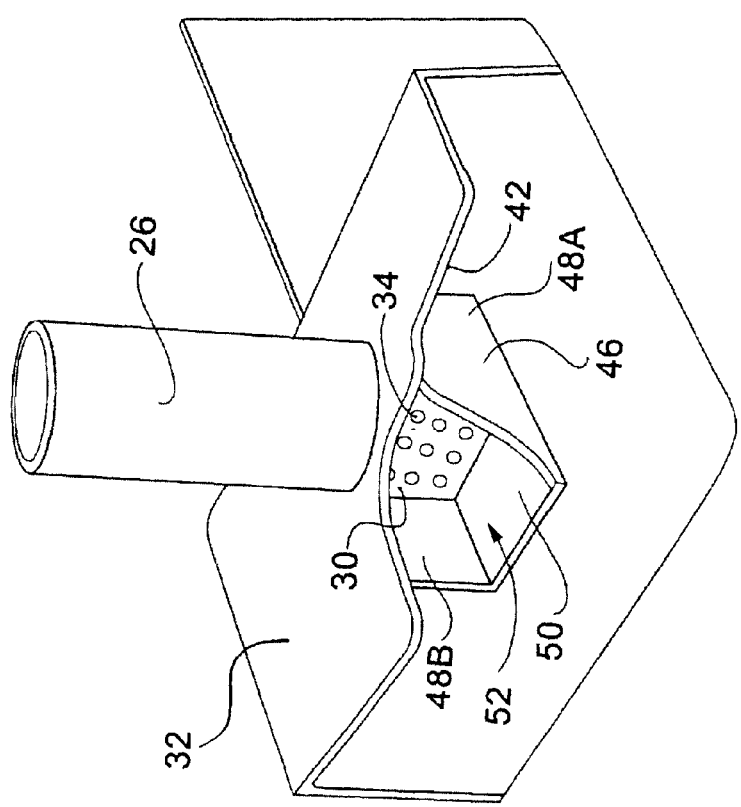

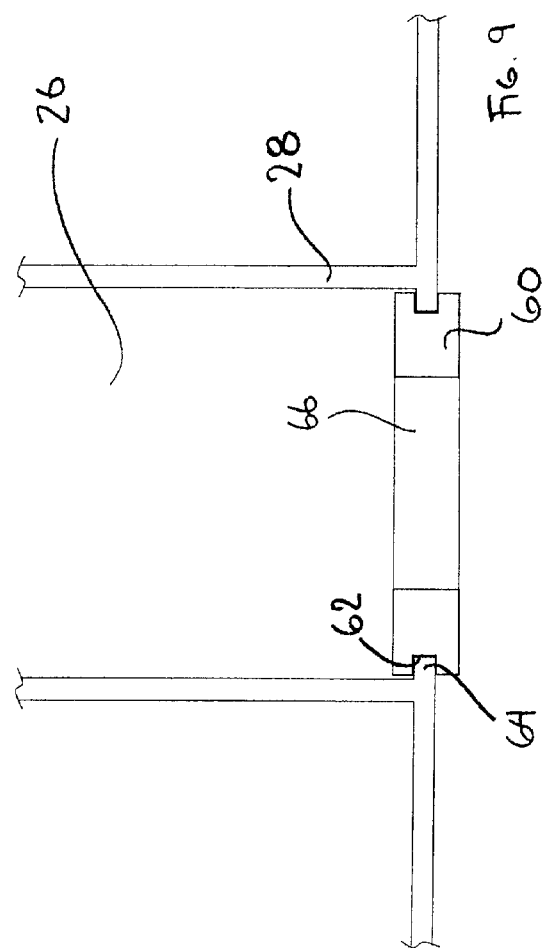
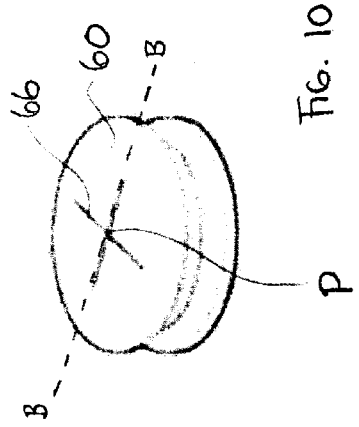

RESERVOIR WITH VENT

FIELD OF THE INVENTION

The present invention relates to the field of fluid management, and in particular to vent structure suitable for use in a fluid reservoir of a motor vehicle.

BACKGROUND OF THE INVENTION

A windshield washer reservoir typically comprises a hollow reservoir, an inlet through which windshield washer fluid is added to fill the reservoir and an exit from which the fluid is delivered through a pump to a windshield washer nozzle.

In a motor vehicle, the space allocated to a windshield reservoir is frequently limited. The shape of a reservoir to fit inside a vehicle may be elongated with the length of the reservoir being greater than its height. A vent may be added to the reservoir distant from the filling inlet to facilitate the liquid filling process. When a liquid is introduced into the reservoir, air inside the reservoir is displaced. Removal of air through the inlet may be inadequate limiting the rate of filling of liquid. Another problem is that air may become trapped within the reservoir. A vent allows the air to be removed from the reservoir (e.g. displaced) so as to accommodate the incoming liquid.

A problem that arises with the addition of a vent to a reservoir is that it introduces a means for liquid to exit the reservoir. Upon acceleration or deceleration of a vehicle liquid may splash outside the reservoir. Such leakage leads to the reduction of windshield washing capability and is aesthetically unpleasing. Thus, in some applications, it may be advantageous to provide a restriction to limit the quantity of liquid that may exit the vent outlet.

SUMMARY OF THE INVENTION

According to an aspect of an embodiment, provided is a reservoir for storing and dispensing a fluid, the reservoir comprising a hollow vessel for holding a volume of fluid, an inlet port located on the hollow vessel for filling the reservoir with fluid, an outlet port located on the hollow vessel for dispensing the fluid, and a vent outlet located on the hollow vessel to permit venting during filling and dispensing operations. The vent outlet is provided in the form of a vent tube having a vent seal located at a base thereof. The vent seal allows for venting as required, while also serving as a flow restrictor to reduce the leakage of fluid from the vent tube in the event of sloshing within the reservoir.

According to another aspect of an embodiment provided is a reservoir for storing and dispensing a fluid, the reservoir comprising a hollow vessel for holding a volume of fluid, an inlet port located on the hollow vessel for filling the reservoir with fluid, an outlet port located on the hollow vessel for dispensing the fluid, and a vent outlet located on the hollow vessel to permit venting during filling and dispensing operations. Also provided is a baffle on an internal surface of the hollow vessel around an inside opening of the vent outlet, the baffle comprising a plurality of walls arranged to define an opening. A vent seal is located inwardly of the opening, the vent seal allowing for venting as required, while also serving as a flow restrictor to reduce the leakage of fluid from the vent tube in the event of sloshing within the reservoir.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3b is a partial sectional perspective view of the fluid reservoir of FIG. 3a showing an exemplary configuration of the vent seal relative to the vent outlet.

FIG. 4a is a diagrammatic representation of a static vent seal showing a first arrangement of apertures provided in the vent seal.

FIG. 4b is a diagrammatic representation of a static vent seal showing a second arrangement of apertures provided in the vent seal.

FIG. 4c is a diagrammatic representation of a static vent seal showing a third arrangement of apertures provided in the vent seal.

FIG. 4d is a diagrammatic representation of a static vent seal showing a fourth arrangement of apertures provided in the vent seal.

FIG. 6 is a partial side sectional view showing the vent seal presented in FIG. 5.

FIG. 7 is a diagrammatic representation of a vent seal having both static and dynamic operating properties.

FIG. 8 is a partial sectional perspective view of a fluid reservoir having a baffle incorporating a vent seal, according to another embodiment of the invention.

FIG. 9 is a partial side sectional view showing a separately formed vent seal, according to another embodiment of the invention.

FIG. 10 is a perspective view of the vent seal of FIG. 9.

DESCRIPTION OF PREFERRED EMBODIMENT

Specific embodiments of the present invention will now be described with reference to the figures. The following detailed description is merely exemplary in nature and is not intended to limit the invention or the application and uses of the invention. A person skilled in the relevant art will recognize that other configurations and arrangements can be used without departing from the scope of the invention. Although the description of the embodiments hereof is in the context of automotive windshield washer fluid reservoirs, the invention may also be used in other fluid reservoirs for automotive and non-automotive use. Furthermore, there is no intention to be bound by any expressed or implied theory presented in the preceding technical field, background, brief summary or the following detailed description.

Figure 1:
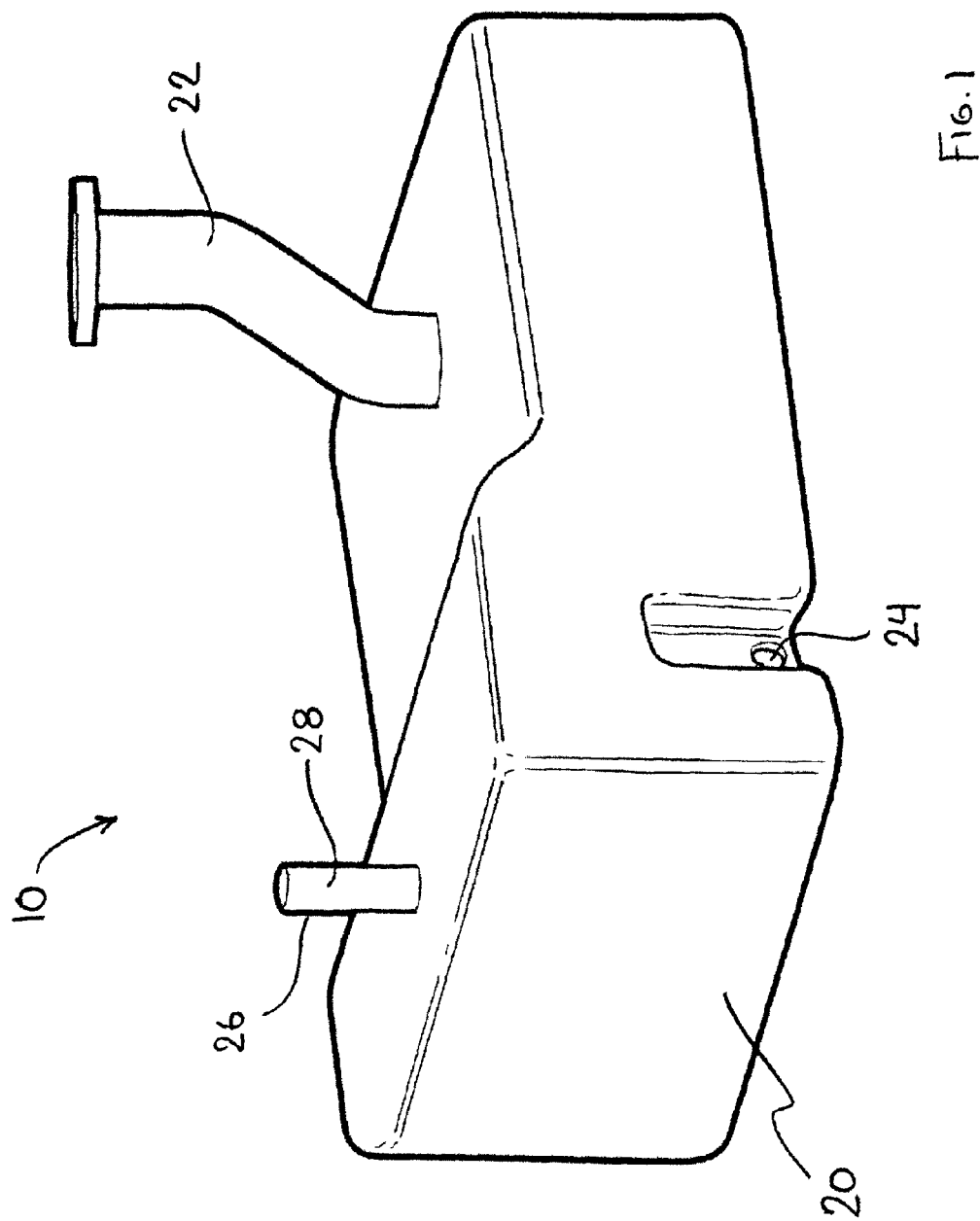
FIG. 1 is a perspective view of an exemplary fluid reservoir having a vent outlet.

Presented in FIG. 1 is an exemplary windshield washer reservoir 10 comprising a hollow vessel 20, an inlet port 22, an outlet port 24, and a vent outlet 26. Hollow vessel 20 is configured to hold a volume of washer fluid, and while shown in one particular configuration, this is merely exemplary. In the embodiment shown, inlet port 22 is located on an upper portion of hollow vessel 20, and permits for filling hollow vessel 20 with washer fluid. Outlet port 24 is located in a lower portion of hollow vessel 20, and provides for delivery of washer fluid to one or more washer nozzles via a pump (not shown). Vent outlet 26 is positioned on the upper portion of hollow vessel 20, and is presented in the form of a vent tube 28. Vent outlet 26 provides the venting to hollow vessel 20 as required during both filling and dispensing of fluid from windshield washer reservoir 10. As will be appreciated, the location of the various washer reservoir 10 components may be varied, as a wide range of configurations are possible, as generally dictated by the particular installation.

Figure 2:
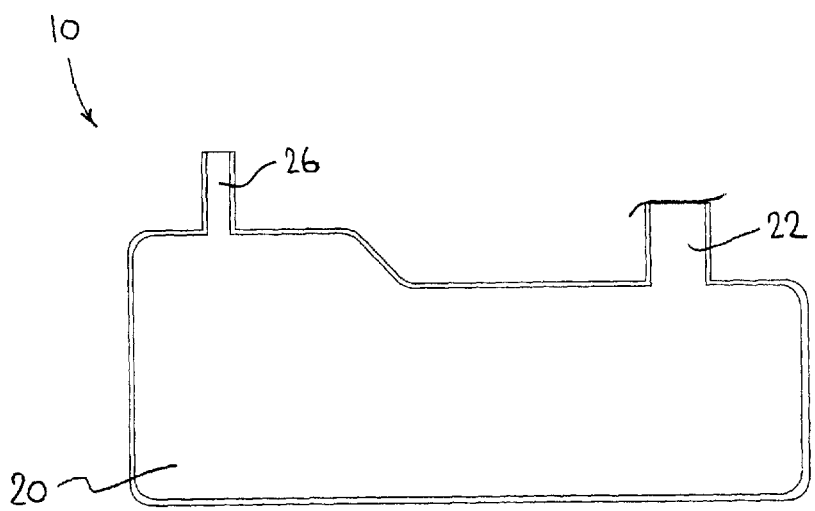
FIG. 2 is a side sectional view of the fluid reservoir of FIG. 1 showing a prior art configuration wherein the vent outlet is provided without a vent seal.

The contents of windshield washer reservoir 10, namely the washer fluid is subject to agitation due to vehicle movement, resulting in slosh or wave action. In prior art designs, such as that shown in FIG. 2, the sloshing of washer fluid has the potential to leak out through vent outlet 26.

Figure 3A:
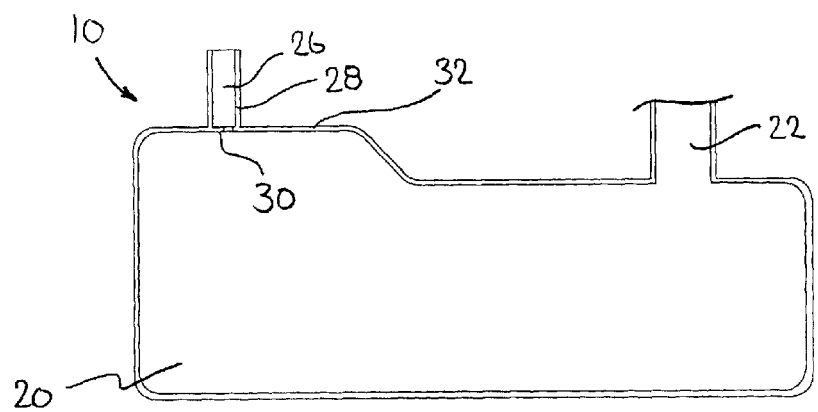
FIG. 3a is a side sectional view of the fluid reservoir of FIG. 1 showing a vent seal incorporated into the vent outlet, according to an embodiment of the invention.

Turning now to FIGS. 3a and 3b, presented is an embodiment of the present invention in which a vent seal 30 is used to prevent the leakage of washer fluid from vent outlet 26. As shown, vent seal 30 is integral with the upper wall 32, and is generally located at the interior end or base of vent tube 28. Vent seal 30 is generally presented as a flow restrictor having a smaller total cross-sectional area than the average, cross-sectional area of the top opening of vent outlet 26. As will be detailed below, the flow restrictor may be provided in a range of configurations, including but not limited to slits and apertures (openings) in the form of slots, circular orifices, etc., presented singularly or in plurality.

In one embodiment, vent seal 30 is provided in a static configuration. In this arrangement, vent seal 30 is provided with at least one aperture 34 or opening (e.g. slot) to establish a permanent airway between hollow vessel 20 and the external environment. In the embodiment presented in FIG. 4a, shown is a partial plan view that presents an exemplary arrangement of the apertures of vent seal 30 (vent tube 28 shown in dot). Vent seal 30 is shown as having a series of 8 slot-shaped apertures 34 formed fully through vent seal, the 8 apertures being separated and provided in radial arrangement relative to point P. Apertures 34 are shaped and sized to provide sufficient venting as deemed required, but are sufficiently small so as to reduce the likelihood of leakage of washer fluid through vent outlet 26. For example, aperture 34 may have a width in the region of 0.25 to 2 mm. In one particular embodiment, apertures 34 are formed to have a width of 0.5 mm. As will be appreciated, apertures 34 may be arranged in a variety of configurations, for example as presented in the alternate arrangement of FIG. 4b. It will be further appreciated that apertures 34 need not be restricted to the use of rectangular slots, as a variety of shapes may be suitably implemented, such as, but not limited to circular, triangular, square, polygonal and irregular shaped apertures. For example, as shown in FIGS. 4c and 4d, apertures 34 are provided in a radial array consisting of triangular and circular apertures, respectively. Regardless of the specific shape, by virtue of apertures 34, provided in vent seal 30, the air pressure within hollow vessel 20 may equilibrate with the external environment, thus dissipating changes in air pressure arising from filling or usage of washer fluid.

Figure 5:
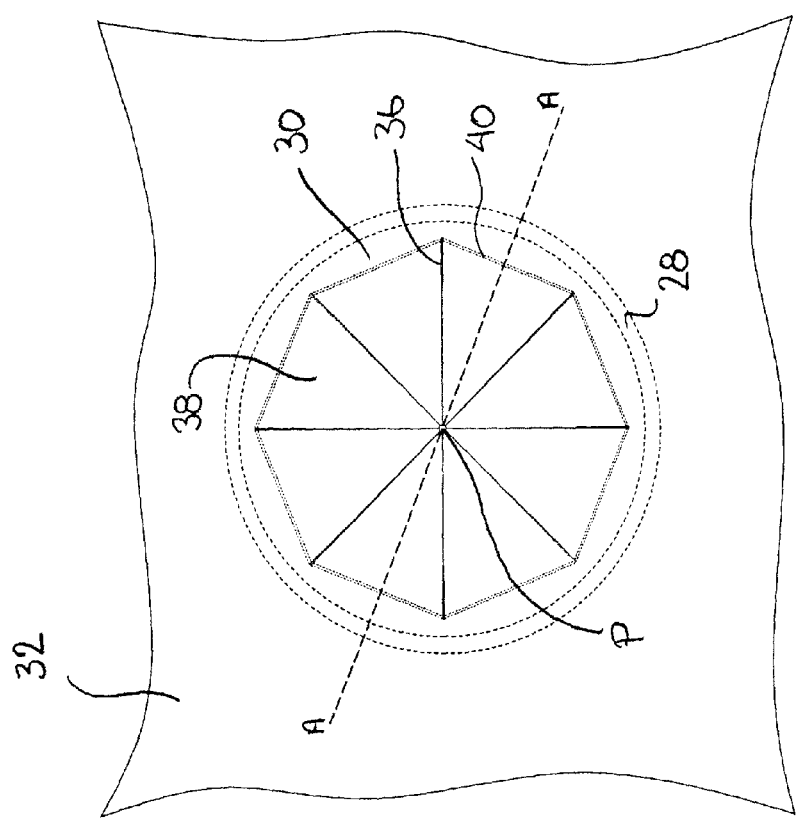
FIG. 5 is a diagrammatic representation of a dynamic vent seal showing an arrangement of slits.

In another embodiment, vent seal 30 is provided in a dynamic configuration where vent seal 30 responds to pressure changes and provides the necessary venting function by opening when necessary. As such, in this arrangement, vent seal 30 is provided with at least one slit that establishes one or more flexible units. On the need to equilibrate the internal/external air pressure, the one or more flexible units displace sufficiently to establish an opening. In the embodiment shown in FIG. 5, vent seal 30 is provided with a series of 8 slits 36 formed fully through vent seal 30, the 8 slits 36 being provided in radial arrangement relative to point P. The slits 36 are arranged to interconnect at point P so as to establish 8 flexible units 38, and as slits 36 are formed fully through vent seal 30, each flexible unit 38 operates independently of the others. In a neutral non-venting condition, that is when venting function is not required, slits 38 remain substantially closed, thereby reducing the likelihood of washer fluid leakage. This neutral condition is shown in FIG. 6 wherein flexible units 38 are not upwardly or downwardly displaced relative to upper wall 32. In a venting condition where the internal air pressure of hollow vessel 20 is higher than the external environment (e.g. positive air pressure; such as during filling of windshield washer reservoir), flexible units 38 displace outwardly as denoted in dot at V', creating a series of vent openings, permitting equilibration of the internal/external environments. In a venting condition where the internal air pressure of hollow vessel 20 is lower than the external environment (e.g. reduced air pressure; such as during heavy usage of washer fluid), flexible units 38 displace inwardly as denoted in dot at V''', creating a series of vent openings, again permitting equilibration of the internal/external environments.

As vent seal 30 is integral with the generally structurally rigid upper wall 32 of hollow vessel 20, to achieve a more flexible behavior of each flexible unit 38, vent seal 30, or at least portions thereof may have a decreased cross-sectional thickness, for example as shown in FIG. 6. In this embodiment, the wall structure of vent seal 30 gets gradually thinner towards point P, as compared to that of upper wall 32, permitting for greater flex in vent seal 30, and in particular flexible units 38. For example, in one embodiment, where upper wall 32 of hollow vessel 20 is provided with a thickness of 2 mm, the wall structure of vent seal 30 may taper to a final thickness of 0.25 mm.

To further enhance the flexibility of flexible units 38, vent seal 30 and in particular in the present embodiment each flexible unit 38 may have a further region of reduced thickness to promote flex at a predetermined location. In the embodiment shown in FIGS. 5 and 6, each flexible unit 38 is provided with a recess 40 formed on the inside surface 42 of upper wall 32. As will be appreciated, recess 40 may be located on one or both the inside and outside surfaces 42, 44, to promote flex at that location during usage.

In a further embodiment, vent seal 30 is configured with features of both the static and dynamic configurations, for example as shown in FIG. 7. In this embodiment, apertures 34 are provided, similar to that shown in the static configuration of FIG. 4c, with the exception that the apertures interconnect at point P. In addition, in this embodiment, 12 apertures are provided. Since the apertures interconnect at point P, a plurality of flexible units 38 are established, as detailed above with respect to the dynamic configuration. As such, vent seal 30 is capable of static-type operation under low-volume venting requirements, as well as dynamic-type operation under high-volume venting requirements.

As vent seal 30 is integral with upper wall 32 of hollow vessel 20, it will generally be constructed from the same material, for example polypropylene. In other embodiments, vent seal 30 may be constructed of a secondary material having higher flex performance, such as, but not limited to silicone, ethylene propylene diene monomer (EPDM), and thermoplastic elastomers (TPE). In general, hollow vessel 20 is injection molded in 2 or more pieces, depending on the design, and later joined together (e.g. hermetically joined together). While the aforementioned apertures 34 or slits 36 may be moldable during the injection molding process, for example through the use of die draw pins that shut off on the injection mold itself, they may also be formed during post-mold processing where these features are formed through, for example, stamping.

While vent seal 30 is presented above as generally in the same plane as upper wall 32, vent seal 30 may be presented in a range of configurations. Presented in FIG. 8 is an embodiment having an added baffle structure 46 located on the internal surface 42 of upper wall 32, around the inside opening of vent outlet 26. Baffle structure 46 comprises a plurality of walls 48A, 48B (rear wall not visible) and a base 50, and serves to provide an added leak-prevention obstruction by restricting washer fluid flow to seal vent 30. As shown, vent seal 30 is incorporated into baffle structure 46, inwardly of baffle opening 52. In the embodiment shown, vent seal 30 is of the aforementioned static configuration, where a series of apertures 34 (e.g. circular orifices) are provided to establish a permanent airway between hollow vessel 20 and the external environment. Alternatively, vent seal 30 may be presented in the aforementioned dynamic configuration where the openings are presented in the form of slits that define flexible units that open/close so as to permit equilibration of air pressure between the internal/external environments. A combined configuration similar to that detailed in FIG. 7 may also be implemented.

In some embodiments, the vent seal may be provided as a separately formed component that is later installed in windshield washer reservoir 10. In one embodiment, for example that shown in FIGS. 9 & 10, vent seal 60 is provided in the general form of a disk having a mid-plane recess 62 for engaging a ridge 64 formed in vent tube 28 of vent outlet 26. Venting function may be achieved by either of the static or dynamic configurations detailed above having regard to the integral vent seal 30. As shown, vent seal 60 provides 4 slot-shaped apertures 66 formed fully through vent seal 60, the 4 apertures being provided in radial arrangement relative to point P. As will be appreciated, the manner of retaining vent seal 60 in position relative to vent tube 26 may be achieved a variety of different ways. In other embodiments, vent seal may be securely retained in vent tube 28 through press/interference-fit or some locking feature such as a tab or other ridge-like structure situated on the inside surface of vent tube 28 above vent seal 60.

The separately formed vent seal 60 is suitable as a retrofit where washer fluid leakage from a vent outlet has been noted. While suitable for use where the components of hollow vessel 20 are formed using an injection molding process, vent seal 60 is particularly well suited for use where hollow vessel 20 is blow molded.

To facilitate installation of vent seal 60, and to achieve a desired performance characteristic, it may be made of a material having suitable pliability. For example, vent seal 60 may be formed of silicone, elastomeric or thermoplastic polyester elastomeric materials.

In some embodiments, vent tube 26 may be a separately formed component, that is later incorporated into hollow vessel 20. For example, vent tube 26 may be injection molded, and subsequently bonded/welded to an injection molded or blow molded hollow vessel. A separately formed vent tube may also be insertion molded into the hollow vessel during the blow molding process. Other methods to attach a separately formed vent tube may be used, for example through the use of integrally molded locking features, or the use of mechanical fasteners. Separately formed vent tubes may be provided with integrally formed vent seals, as detailed for example in FIG. 6, or may be configured to received separately formed vent seals, as detailed for example in FIG. 9.

While presented having regard to windshield washer reservoirs, the vent structure presented here may be applicable to other automotive and non-automotive uses. For example, in automobiles, the vent structure may be used for non-pressurized rad tanks. In non-automotive applications, the vent structure may be used for large-format water tanks, such as those used in landscaping applications. In addition, while the liquid has generally been referred to as washer fluid, the liquid may be any type of liquid including, but not limited to water, aqueous solutions of isopropanol, ethanol, ethylene glycol, or any combination thereof.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A reservoir for storing and dispensing a fluid, the reservoir comprising:
   a hollow vessel for holding a volume of fluid;
   an inlet port located on said hollow vessel for filling said reservoir with fluid;
   an outlet port located on said hollow vessel for dispensing the fluid; and
   a vent outlet located on said hollow vessel to permit venting during filling and dispensing operations,
   wherein said vent outlet is provided in the form of a vent tube having a vent seal located at a base thereof, said vent seal allowing for venting as required, while also serving as a flow restrictor to reduce the leakage of fluid from said vent tube in the event of sloshing within said reservoir,
   wherein said vent seal is configured with a plurality of slits in radial arrangement relative to a central point of said vent seal, said plurality of slits defining a plurality of flexible units that displace during venting to create a series of vent openings, said plurality of slits being substantially closed in the neutral non-venting condition.

2. The reservoir according to claim 1, wherein said plurality of flexible units are outwardly displaceable to vent positive air pressure to the external environment, and inwardly displaceable to permit inward flow of air under conditions of reduced air pressure in said hollow vessel.

3. The reservoir according to claim 1, wherein said vent seal is an integral component of said hollow vessel, said vent seal forming part of an upper wall of said hollow vessel at the base of said vent tube.

4. The reservoir according to claim 1, wherein said vent seal is a separately formed component that is later incorporated into said vent tube of said vent outlet.

5. The reservoir according to claim 1, wherein said vent seal provides a wall structure having a decreased cross-sectional thickness to promote increased flexible behavior.

6. The reservoir according to claim 5, wherein said cross-sectional thickness of said wall structure gradually decreases towards said central point.

7. The reservoir according to claim 1, wherein said vent seal provides a wall structure having one or more recesses formed therein to promote flex of said plurality of flexible units.

8. The reservoir according to claim 1, wherein said vent seal is constructed of a secondary material having a higher flex performance compared to said hollow vessel.

9. The reservoir according to claim 1, wherein said vent tube is a separately formed injection molded component that is attached to said hollow vessel through one or more of bonding, welding and mechanical fastening.

10. The reservoir according to claim 9, wherein said hollow vessel is blow molded, said vent tube being attached to said hollow vessel through insert molding during the hollow vessel blow molding process.

11. A reservoir for storing and dispensing a fluid, the reservoir comprising:
a hollow vessel for holding a volume of fluid;
an inlet port located on said hollow vessel for filling said reservoir with fluid;
an outlet port located on said hollow vessel for dispensing the fluid; and
a vent outlet located on said hollow vessel to permit venting during filling and dispensing operations,
wherein said vent outlet is provided in the form of a vent tube having a vent seal located at a base thereof, said vent seal allowing for venting as required, while also serving as a flow restrictor to reduce the leakage of fluid from said vent tube in the event of sloshing within said reservoir
wherein said vent seal is configured with a plurality of apertures provided in radial arrangement relative to a central point of said vent seal to establish a permanent airway between said hollow vessel and the external environment, said plurality of apertures being sized to permit for venting as required, but each aperture being sufficiently small so as to reduce leakage of fluid in the event of sloshing, said plurality of apertures being interconnected at said central point thus defining a plurality of flexible units, said plurality of apertures providing venting function under low-volume venting requirements, said plurality of flexible units being displaceable to create additional vent openings under high-volume venting requirements.

12. The reservoir according to claim 11, wherein said vent seal is an integral component of said hollow vessel, said vent seal forming part of an upper wall of said hollow vessel at the base of said vent tube.

13. The reservoir according to claim 11, wherein said vent seal is a separately formed component that is later incorporated into said vent tube of said vent outlet.

14. The reservoir according to claim 11, wherein said vent seal provides a wall structure having a decreased cross-sectional thickness to promote increased flexible behavior.

15. The reservoir according to claim 14, wherein said cross-sectional thickness of said wall structure gradually decreases towards said central point.

16. The reservoir according to claim 11, wherein said vent seal provides a wall structure having one or more recesses formed therein to promote flex of said plurality of flexible units.

17. The reservoir according to claim 11, wherein said vent seal is constructed of a secondary material having a higher flex performance compared to said hollow vessel.

18. The reservoir according to claim 11, wherein said vent tube is a separately formed injection molded component that is attached to said hollow vessel through one or more of bonding, welding and mechanical fastening.

19. The reservoir according to claim 18, wherein said hollow vessel is blow molded, said vent tube being attached to said hollow vessel through insert molding during the hollow vessel blow molding process.

* * * * *